United States Patent [19]

Guironnet et al.

[11] Patent Number: 4,986,955

[45] Date of Patent: Jan. 22, 1991

[54] DEVICE FOR REMOVING PERIPHERAL FUEL RODS FROM A FUEL ASSEMBLY OF A NUCLEAR REACTOR

[75] Inventors: Louis Guironnet, Lyon; Michel Bline, L'Arbresle, both of France

[73] Assignees: Framatome, Courbevoie; Cogema, Velizy Villacoublay, both of France

[21] Appl. No.: 458,478

[22] Filed: Dec. 28, 1989

[30] Foreign Application Priority Data

Dec. 28, 1988 [FR] France .................. 8817345

[51] Int. Cl.⁵ .................. G21C 19/26; G21C 19/32
[52] U.S. Cl. .................. 376/261; 376/248; 294/118
[58] Field of Search .......... 376/261, 260, 264, 268, 376/271, 248; 294/906, 118, 116

[56] References Cited

U.S. PATENT DOCUMENTS

| | | | |
|---|---|---|---|
| 3,310,337 | 3/1967 | Riemenschneider | 376/264 |
| 3,690,713 | 9/1972 | Ristow | 376/264 |
| 4,659,537 | 4/1987 | Beuneche et al. | 376/261 |
| 4,673,545 | 6/1987 | Cooke et al. | 376/261 |
| 4,681,213 | 7/1987 | Winiasz | 294/116 |
| 4,683,109 | 7/1987 | Cooper, Jr. et al. | 376/261 |
| 4,857,262 | 8/1989 | Spilker | 376/261 |
| 4,886,635 | 12/1989 | Forster et al. | 376/268 |

FOREIGN PATENT DOCUMENTS 0109902  5/1984  European Pat. Off. .
0192406  8/1986  European Pat. Off. .
0200988  11/1986  European Pat. Off. .

Primary Examiner—Daniel D. Wasil
Attorney, Agent, or Firm—Pollock, Vande Sande & Priddy

[57] ABSTRACT

The device comprises a rod (20) on which is mounted a means (22, 24, 25) for the support and displacement of a work tool which is movable in an axial direction of the rod (20) and in two directions perpendicular to this axial direction. The tool comprises tongs consisting of two arms which are articulated together about a spindle fixed on the means (22, 24, 25) for support and displacement in a direction parallel to the axis of the rod (20). The tongs comprise end jaws which are capable of gripping a fuel rod. The gripping of the tongs is controlled remotely and the positioning of these tongs on a fuel rod to be removed is checked by means of a video camera (26).

6 Claims, 8 Drawing Sheets

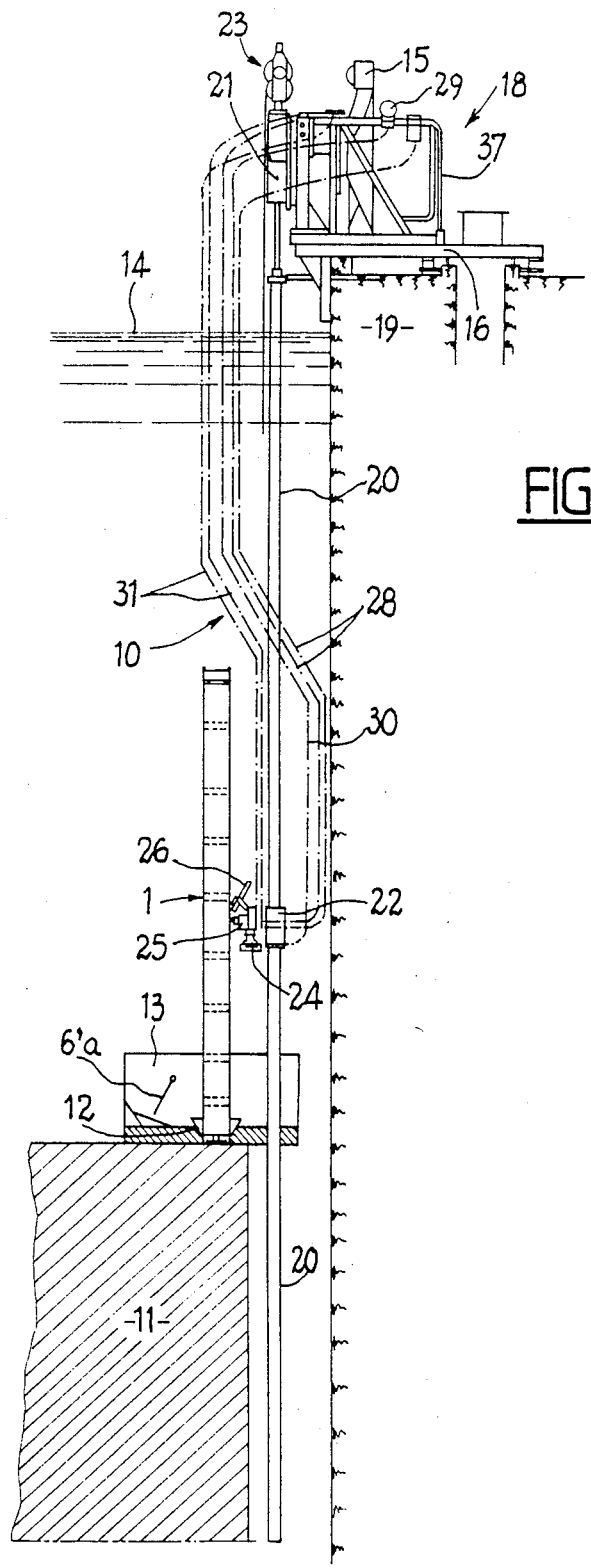
FIG_2

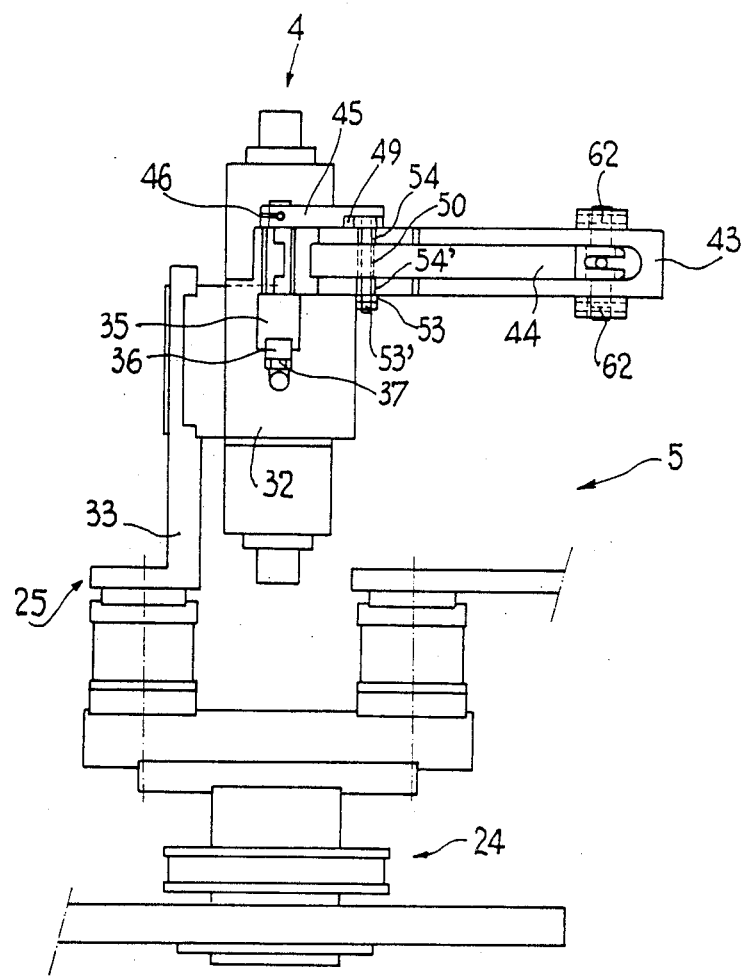
FIG_3

FIG_4
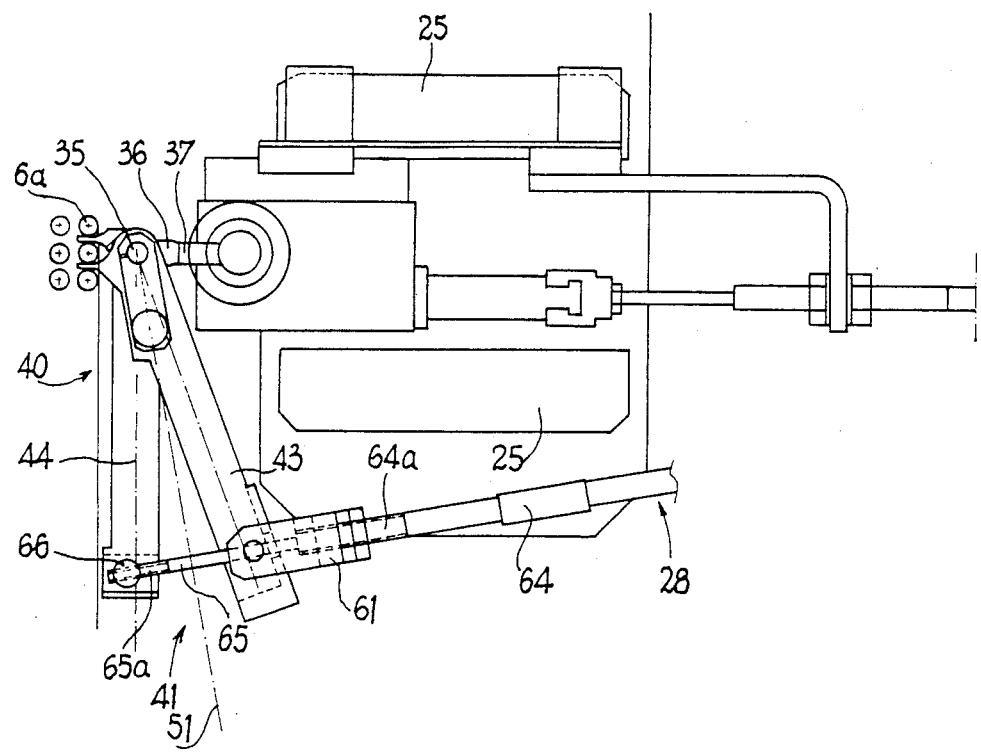

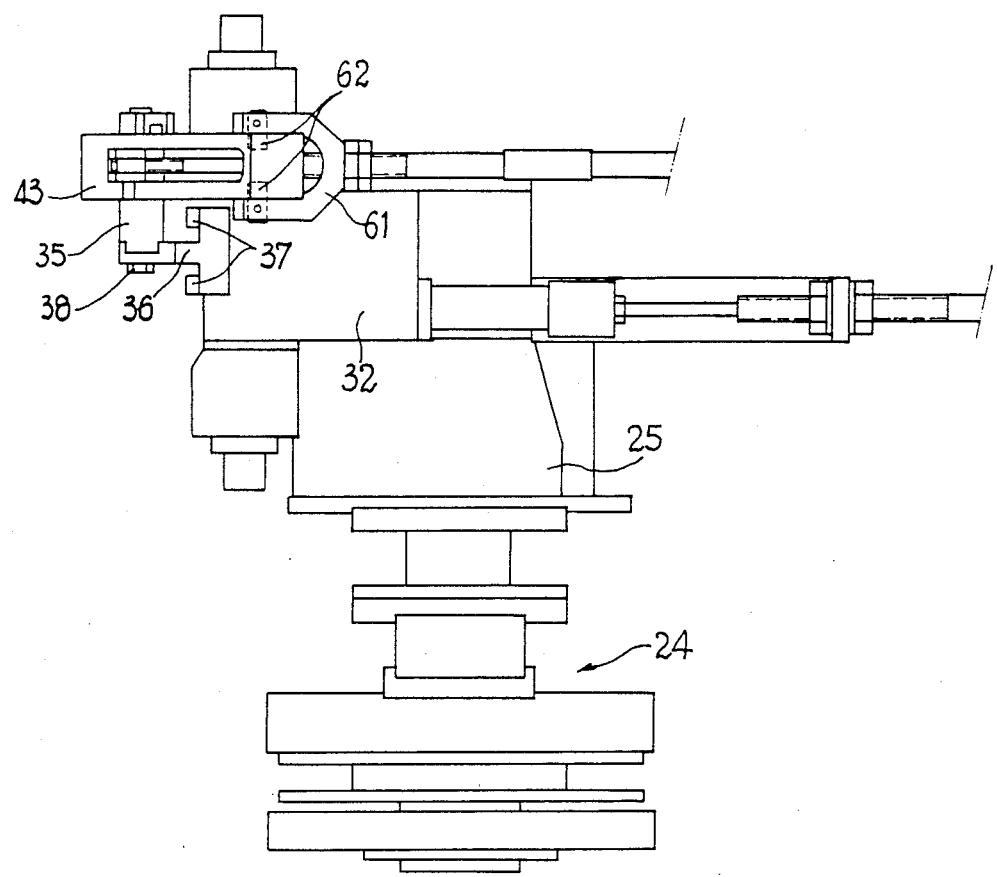
FIG_5

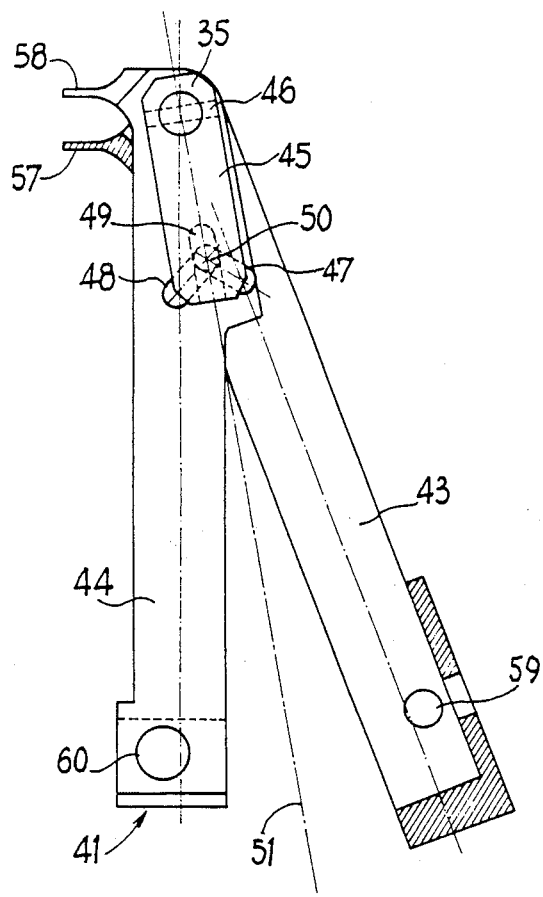
FIG_6
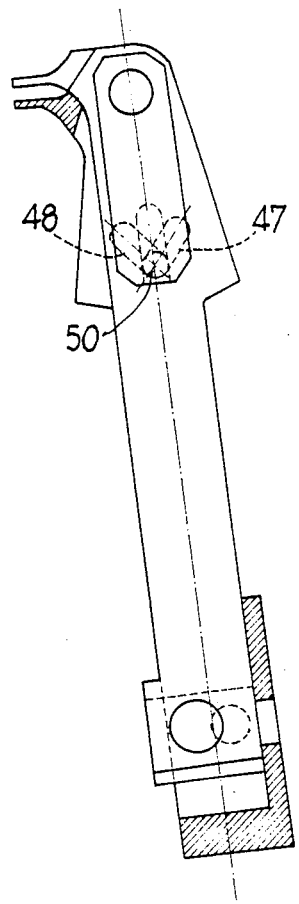
FIG_7
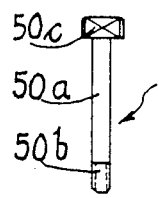
FIG_6A
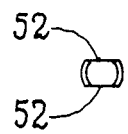
FIG_6B

FIG_8
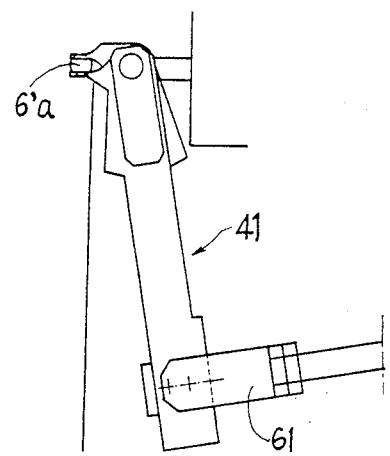
FIG_9
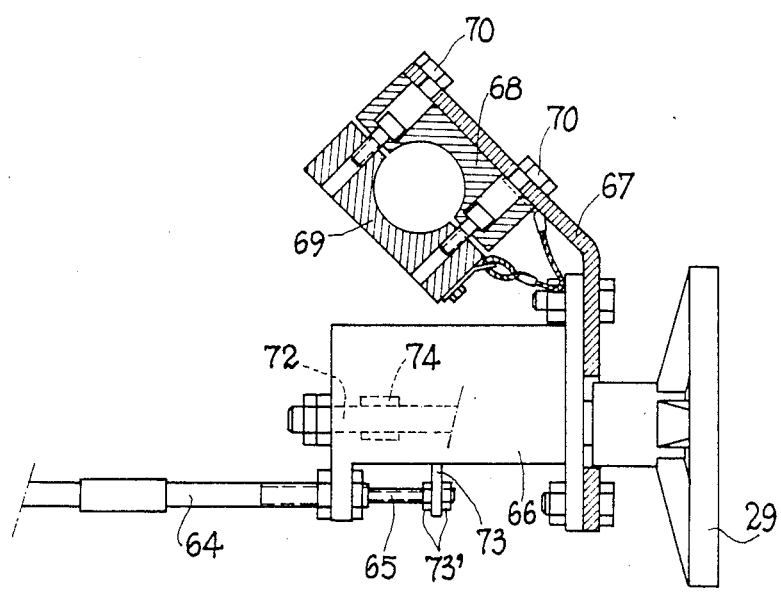

DEVICE FOR REMOVING PERIPHERAL FUEL RODS FROM A FUEL ASSEMBLY OF A NUCLEAR REACTOR

FIELD OF THE INVENTION

The invention relates to a device and a method for removing peripheral rods from a fuel assembly of a nuclear reactor and, in particular, fuel rods which have at least one zone of breakage and comprise several pieces along their length.

BACKGROUND OF THE INVENTION

The fuel assemblies of water-cooled nuclear reactors, such as pressurized-water nuclear reactors, comprise a framework in which fuel rods of great length are disposed in order to form a bundle. The framework comprises spacer grids which are spaced relative to one another along the length of the assembly and connected together by guide tubes. End joining pieces are connected to the end of the guide tubes, which are longer than the fuel rods.

Each of the spacer grids comprises an assembly of cells each intended to receive a fuel pencil and disposed in a regular network, generally a squared mesh.

At the level of each of the cells intended to receive a fuel rod, the spacer grids comprise means for gripping the rod, while also ensuring both transverse retention and longitudinal retention of such rod. These gripping means generally consist of bosses projecting inwards relative to the walls of the cell of the grid and of springs consisting of resilient elements formed in the metal of certain walls of the cells of the grid or, alternatively, connected to these walls.

After a greater or lesser residence time in the tank of a light-water nuclear reactor, the rods of the fuel assemblies may become brittle due to oxidation phenomena or due to transformations suffered by their sheaths under irradiation. The sheaths of certain rods may be perforated or torn by a peripheral guide fin of a spacer grid which has accidentally been folded inwards or by a foreign body conveyed by the fluid for cooling the reactor circulating in contact with the fuel rods. The fins or the foreign bodies may be encrusted in the sheath which is then deformed or perforated in the corresponding zone.

It is necessary to perform repairs on fuel assemblies comprising rods whose sheath is perforated or torn, by removing these rods and replacing them with new ones. Removal is performed by pulling the rod via its upper end plug after having removed the upper joining piece of the assembly. Rods may also be removed and replaced by removing the lower joining piece.

To this end, fuel assemblies of recent design comprise joining pieces whose elements for fixing on guide tubes may be removed without difficulty.

All the operations for removing and replacing rods in the spent assemblies of a nuclear reactor are performed under a certain depth of water which is greater than three meters, inside a storage pool in which the fuel assemblies are placed in a vertical position. The operators carrying out the repair operations from the edge of the pool are thus protected against radiation from the spent assemblies.

The fuel rods whose sheath is perforated or torn are liable to break during their removal, the gripping elements of the spacer grids exerting a certain axial retention force on the rods which it is necessary to overcome in order to perform the removal.

There then remain pieces of rod inside the fuel assembly which can no longer be removed by the usual means.

The peripheral rods of the assembly, i.e., the rods placed in the four outer rows which are adjacent to the frame of the spacer grids, are the most exposed to impacts with foreign bodies and to the effects of penetration by the guide fins of the spacer grids. These rods are thus the most exposed to breakage during the removal operations.

To date, there was no known device or method making it possible to remove the peripheral rods of a fuel assembly comprising several successive pieces in the direction of their length, the assembly being placed under water in a storage pool.

The spent and damaged assembly must be replaced by a new assembly and dismantled or repaired by using complicated equipment which is available only in nuclear fuel reprocessing plants.

This results in increased operating costs for the nuclear reactor.

SUMMARY OF THE INVENTION

The invention thus aims to propose a device for removing peripheral rods from a fuel assembly of a nuclear reactor comprising a framework consisting of a plurality of spacer grids retaining the fuel rods in a uniform network in the transverse directions and in the axial direction of the rods, by gripping means associated with the cells of the grids in which the rods are inserted as well as of guide tubes replacing certain rods in the network and of end joining pieces fixed on the ends of the guide tubes, removal being performed remotely and under a certain depth of water in a pool for storing fuel assemblies after removal of an end joining piece of the assembly, by the device which comprises a rod of great length on which is mounted a means for the support and displacement of a work tool which is movable in an axial direction of the rod and in two directions perpendicular to this axial direction, this device making it possible to remove rods which have suffered breakage and comprising several pieces along their length.

To this end, the work tool comprises:
- tongs consisting of two arms articulated together about a shaft fixed on the means for support and displacement in a direction parallel to the axis of the rod and comprising end jaws which are capable of gripping a fuel rods;
- the means for remotely controlling the tongs comprising an element which is movable in translation and an element for guiding the movable element, each connected to an arm of the tongs in the vicinity of the end of the corresponding arm opposite to the end jaw; and
- at least one video camera carried by the device for support and displacement in order to supply an image of the zone in which the rod is gripped, removal being performed by displacing the means for support and displacement in the vertical direction after positioning and gripping of the jaws of the tongs on a part of the pencil.

BRIEF DESCRIPTION OF THE DRAWINGS

In order that the invention may be more clearly understood, a description will now be given, by way of example and with reference to the appended drawings, of an embodiment of a removal device according to the invention and its use for removing peripheral rods of a fuel assembly for a pressurized-water nuclear reactor.

FIG. 2 is an overall view in elevation of the removal device according to the invention in an operating position at the level of a fuel assembly located in a storage pool.

FIG. 3 is a front view of the work tool, in to a direction perpendicular to a row of peripheral rods of the assembly.

FIG. 4 is a plan view in direction 4 in FIG. 3.

FIG. 5 is a side view of the work tool according to 5 in FIG. 3.

FIGS. 6 and 7 are plan views of the gripping tongs of the tool shown in FIGS. 3, 4 and 5, in open closed position, respectively.

FIGS. 6A and 6B are detail views of the positioning spindle of the tongs shown in FIGS. 6 and 7.

FIG. 6A is a view in elevation.

FIG. 6B is a plan view.

FIG. 8 is a diagrammatic plan view of the tongs in a position for gripping a peripheral rod of an assembly;

FIG. 9 is a view in elevation with a partial section of the part of the means for controlling the tongs disposed above the level of the pool.

DESCRIPTION OF PREFERRED EMBODIMENT

Figure 1:
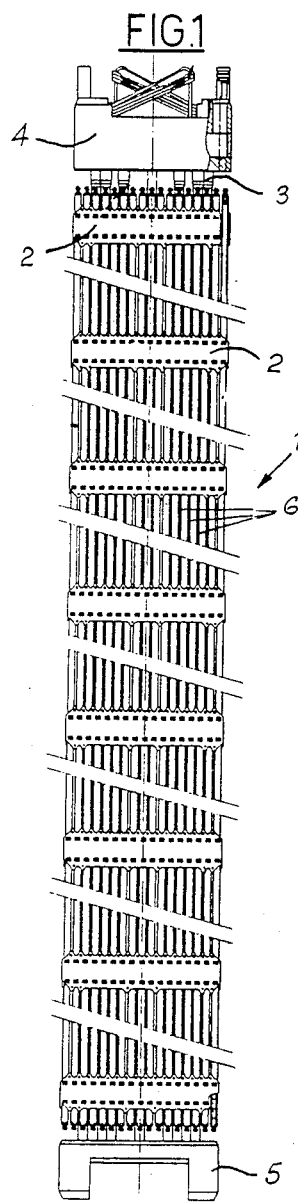
FIG. 1 is a view in elevation of a fuel assembly of a pressurized-water nuclear reactor.

FIG. 1 shows a fuel assembly comprising

This fuel assembly comprises of spacer grids 2 spaced in the longitudinal direction of the assembly guide tubes 3, to which the grids 2 are rigidly fixed, an upper joining piece 4 and a lower joining piece 5 which are fixed to the end of the guide tubes 3.

The fuel rods or fuel rods of the assembly which are shorter than the guide tubes 3 are disposed in the framework so as to form a bundle in which the rods are disposed parallel to one another.

The rods are held laterally by the spacer grids 2 so as to form a uniform network with squared mesh in the transverse sections of the assembly. The spacer grids 2 also retain the fuel rods 6 in their longitudinal direction by gripping means disposed at the level of each of the cells receiving a fuel rod and consisting of bosses projecting inwards in the cell and of resilient springs pressing the fuel rod with a certain pressure against the bosses.

The spacer grids 2 comprise an outer frame of generally square form, consisting of small plates assembled together at their corners.

The fuel rods disposed against the inner surface of the small plates of the frame of the spacer grids form the peripheral rods, such as the rod 6a.

FIG. 2 shows the removal device 10 which makes it possible to remove the peripheral rods of a fuel assembly 1 disposed inside a storage pool for fuel assemblies, even if these peripheral fuel rods have several successive pieces in their length.

The fuel assembly 1 rests, by means of its lower joining piece 5, on a support 11, the positioning of the assembly in a vertical position in which the rods are removed being facilitated by an insertion device which is flared towards the top 12, fixed on the base 11 and which receives the lower part of the assembly.

A vessel 13 for recovering pieces of fuel rods 6'a is placed on the support 11, near the assembly 1.

The upper part of the assembly is at a depth, below the upper level 14 of the pool, which is substantially equal to three meters, this depth of water ensuring effective biological protection for an operator 15 performing the removal operations from the platform 16 of a control station 18 fixed on the upper part of a lateral wall 19 of the storage pool.

The device according to the invention comprises a rod 20 of great length disposed vertically in the vicinity of the wall 19 of the pool and connected, at its upper part 21, to a vertical support which is integrally attached to the platform 16.

A carriage 22 is mounted so as to be movable in the longitudinal direction of the rod 20 and may be displaced in this longitudinal direction by a winch 23 which may be activated by a handle used by the operator 15.

By means of a displacement device 24, the carriage 22 carries a support 25 on which is fixed the tool for removing the peripheral fuel rods of the assembly 1 and at least one video camera 26.

The removal tool is remotely controlled by remote control means 28 of known type, such as ball remote controls comprising a sheath inside which a flexible element is mounted so as to be movable, and which makes it possible to provide a pulling or pushing action which is remotely controlled, for example manually, by a wheel 29 fixed on the railing of the platform 16 of the control station 18.

Ball remote controls 30 and 31 also make it possible to remotely control the displacements of the tool support 25 by means of the displacement device 24 and to ensure the orientation control of the video cameras, such as 26, respectively.

In FIG. 2, the carriage 22 and the displacement device 24 are in a position which makes it possible to remove a peripheral rod 6a from the assembly 1, the upper joining piece 4 of the assembly being removed.

The device for the support and positioning of the tool support 25 is the subject of a patent application filed jointly by the company FRAMATOME and the company COGEMA on the same day as the present patent application.

FIGS. 3, 4 and 5 show the displacement device 24 of the tool support 25 which consists of a crossed carriage displacement assembly. This displacement assembly is fixed on the carriage 22 so as to be movable in the vertical direction and comprises a first carriage, or lower carriage, which is movable in a first horizontal direction substantially perpendicular to the wall 19 of the pool, on which a second carriage, or upper carriage, carrying the support device 25, is mounted so as to be movable in a second horizontal direction substantially parallel to the wall of the pool 19.

The vertical displacement carriage 22 and the crossed carriage assembly 24 make it possible to place the support 25 and the removal tool carried by this support at the level of a zone of a piece of rod to be removed located between two spacer grids, according to which the piece of rod is grasped and gripped in order for it to be removed from the framework of the assembly.

The displacements of the crossed carriage assembly 24 are ensured by ball remote controls 30 whose upper part is accessible from the control station 18. A video image of the work zone provided by a camera such as 26, enables the operator to place the support 25 and the tool for removing the rods in the desired position.

The removal tool comprises a body 32 fixed on a bracket 33 forming one of the elements of the tool support 25.

The body 32 of the tool will be described in greater detail with reference to FIG. 10.

A shaft 35 is fixed on a part of the body 32 by means of a support 36 and of screws 37 and 38. The shaft 35 is fixed in a vertical position, i.e., a position parallel to the axis of the rod 20 which corresponds to the direction of displacement of the carriage 22.

The part 40 of the removal tool which grasps and grips the fuel rods 6a located at the periphery of a fuel assembly consists of tongs 41 which are visible on a larger scale in FIGS. 6 and 7. The tongs 41 comprise two arms 43 and 44 which are articulated, at one of their ends, on the shaft 35.

As may be seen, in particular, in FIG. 3, the arm 43, or female arm, has the form of a rectangle in which the second arm 44, or male arm, fits in the complete closure position of the tongs shown in FIG. 7.

The tongs 41 also comprise a guide plate 45 rigidly fixed to the shaft 35 above the female arm 43 by means of a pin 46.

The two parallel parts of the rectangle forming the female arm 43 of the tongs 41 are traversed, in their part which is situated below the guide plate 45, by oblong openings 47 inclined relative to the longitudinal axis of the arm 43, in the direction of the male arm 44.

Similarly, the male arm 44 is traversed by an oblong opening 48 inclined relative to its longitudinal axis and directed towards the female arm 43. The oblong openings 47 and 48 are superposed, at their end part, so as to provide a bore which permits the passage of a spindle 50 for positioning the tongs perpendicular to the arms 43 and 44.

The guide plate 45 comprises an oblong cavity 49 on its lower surface in a longitudinal direction corresponding to the direction of the axis 51 of symmetry of the tongs 41. At its upper part, the cavity 49 covers the part common to the oblong apertures 47 and 48 forming the bore for the passage of the positioning spindle 50.

The positioning spindle 50, which may be seen in 6A and 6B, comprises a central part 50a in the form of a smooth rod, a threaded end part 50b and a head 50c having two flats 52, as may be seen in FIG. 6B.

The head 50c of the spindle 50 is engaged in the cavity 49 of the guide plate 45.

Two washers 54 and 54' are placed around the smooth part 50a of the spindle 50, in position in the oblong apertures in the female arm 43 of the tongs, and, on the threaded end 50b of the spindle 50 projecting relative to the lower part of the arm 43 are engaged a fixing nut 53 and a counternut 53'. The positioning spindle 50 is thus held in the oblong openings 47 and 48 and in the cavity 49 whilst remaining movable inside these openings and cavities during the maneuvering of the tongs. This permits accurate positioning of the male arm 44 and of the female arm 43, the longitudinal axes of which remain perfectly symmetrical relative to the axis 51 of symmetry of the tongs during the displacements of the tongs between the open position thereof shown in FIG. 6 and the completely closed position thereof shown in FIG. 7.

The positioning spindle 50 comes up against the end of the apertures 47 and 48 in the completely open position of the tongs shown in FIG. 6, which makes it possible perfectly to define this open position and the orientation of the arms 43 and 44 on the support 25.

In the completely open position of the tongs shown in FIG. 6, the male arm 44 is exactly parallel to a row of peripheral rods 6a of the assembly.

The arms 43 and 44 comprise end jaws 57 and 58, respectively, in the vicinity of the articulation shaft 35.

In the open position of the tongs shown in FIG. 6, the distance between the inner surfaces of the jaws 57 and 58 is slightly greater than the diameter of a rod 6a. On the other hand, the end parts of the jaws 57 and 58 are produced in the form of thin flats which may be inserted between two successive rods 6a, as may be seen in FIG. 4, in which the tongs 41 are shown in an open position, as in FIG. 6.

At its end opposite to the jaw 57 of the tongs, the female arm 43 is traversed, in its two parallel parts, by openings 59.

Similarly, at its end opposite to the jaw 58, the male arm 44 is perforated by a circular opening 60.

A cover 41, which may be seen, in particular, in FIGS. 4 and 5, comprises two arms placed on either side of the female arm 43 and comprises openings permitting the articulated mounting of the cover 61 on the end part of the female arm 43 by means of spindles 62 engaged in the openings 59 in the female arm 43 and immobilized by pins in the cover 61.

The cover 61 comprises a threaded hole in its end part, inside which is screwed the threaded end 64a of a sheath 64 of a ball remote control whose flexible element 65, mounted so as to be movable in translation by the balls in the sheath 64, is connected, at its threaded end 65a to a nut 66 engaged in the opening 60 in the male arm 44 of the tongs 41.

FIG. 9 shows the end of the ball remote control 28 located opposite the gripping tongs 41 at the level of the control station 18 of the removal device shown in FIG. 2.

The end of the sheath 64 is fixed on the support 66 of a displacement device of the movable flexible element 65 of the ball remote control. The body 66 of the displacement device is fixed by means of a bracket 67 and two half-flanges 68 and 69 which are clamped together by screws 70 on the railing of the platform 16 of the control station 18.

A screw 72, one end of which is integrally attached to the wheel 29, is placed inside the housing 66 and makes it possible to drive a carriage 73 in translation along the length of the casing, on which carriage is fixed, by means of nuts 73', the end of the flexible element 65 of the ball remote control.

The displacement of the flexible element 65 of the ball remote control inside the sheath 64 makes it possible to close the tongs on a rod 6a after these tongs have engaged the rod, as may be seen in FIG. 4.

A stop 74 makes it possible to arrest the movement of the screw 72 when the displacement of the arms of the tongs makes it possible to obtain the complete closure of these tongs, as may be seen in FIG. 7.

In this position, the rod 6a may be slightly crushed between the jaws 57 and 58 of the tongs, as may be seen in FIG. 8. This deformation makes it possible to improve the grasping force of the tongs on the rod during extraction. However, it is necessary to avoid too great a deformation, which could lead to a breakage or tearing of the rod 6a.

In the completely closed position of the tongs, as may be seen in FIG. 7, the positioning spindle 50 has stopped at the end of the oblong apertures 47 and 48, which coincide.

Figure 10:
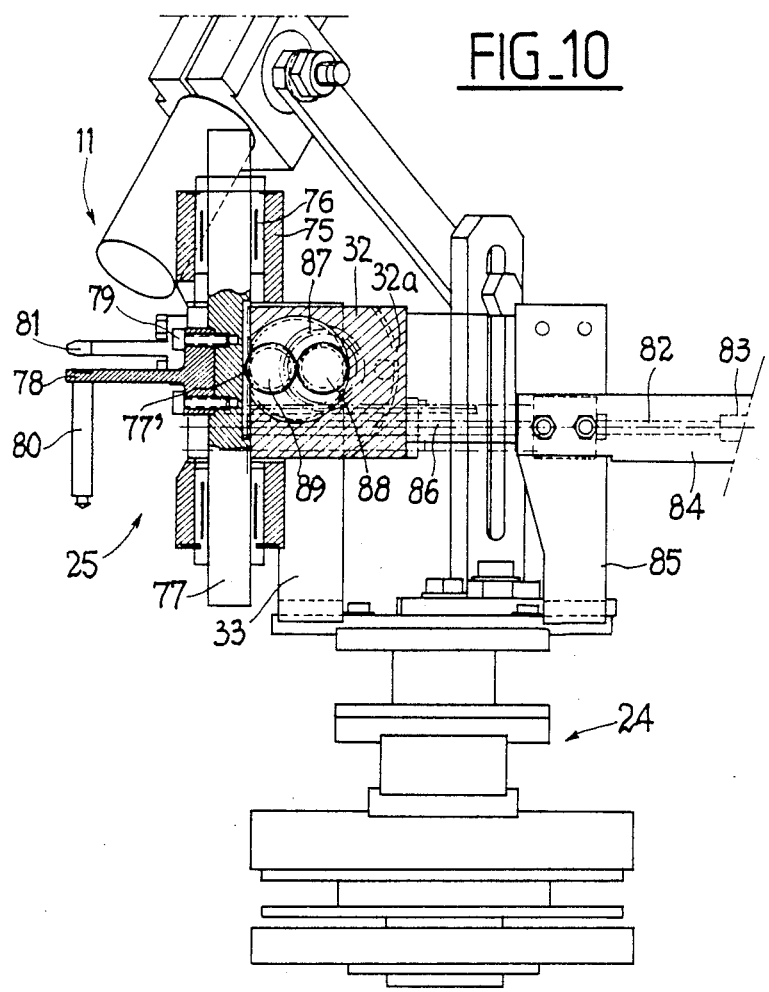
FIG. 10 is a view in elevation with a partial section of the support for the tool on which is mounted a means for pushing the fuel rods to the level of the spacer grids.

FIG. 10 shows a pushing device which may be mounted on the body 32 of the removal tool in order to push a fuel rod which has broken inside a spacer grid. The piece of rod must be pushed outside the spacer grid in order to be seized by the tongs 41.

The body 32 of the tool comprises a central part 32a on which is mounted, in the vertical direction, a slide bush 75 comprising two parts, in each of which is mounted a ball bush 76. A shaft 77 is mounted so as to slide in the bush 75 and comprises a central part on which a rack 77' is machined.

A pushing fork 78 is fixed by means of screws 79 to the central part of the sliding shaft 77. The fork 78 carries, at its outer end opposite to the shaft 77, a thrust device 80 whose diameter corresponds substantially to the outer diameter of the sheath of a rod 6a.

Support forks, such as 81, are placed above and on either side of the pushing fork 78. The support forks 81, whose shape may be seen in FIG. 11 with reference to an alternative embodiment, comprise, at their end, inner recesses which may be engaged over the peripheral rods 6'a located on either side of the rod 6a on which pushing and removal is performed.

The flexible element 82 of a ball remote control, whose sheath 83 is fixed on a part of the support 25 by means of an arm 84 and a bracket 85, is connected to an end part of a rack 86 mounted so as to be movable in the central part 32a of the body 32 and so as to engage with a pinion 87 whose rotation results in the rotation of a pinion 88 and, by means of a second pinion 89, engaging with the rack 77', the vertical displacement of the sliding shaft 77 and of the pushing fork 78. The displacement of the movable flexible element 82 of the ball remote control in the direction of the pushing action results in a downward displacement of the sliding shaft 77, of the pushing fork 78 and of the thrust device 80.

The ball remote control 82, 83 may be activated from the control station 18 by the operator 15.

Figure 11:
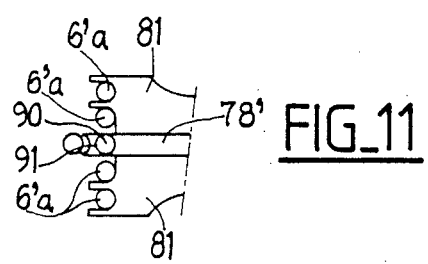
FIG. 11 is a plan view in direction 11 in FIG. 10.

FIG. 11 shows an alternative embodiment of the pushing device in FIG. 10, the pushing fork 78' disposed between the support forks 81 comprising a recess 90 whose diameter is slightly greater than the diameter of the sheath of a pencil and an inner recess 91 at its end which is capable of engaging on the outer surface of a fuel rod 6 situated on the first inner row of fuel rods opposite the rod 6a being removed.

The pushing fork 78' is controlled in the same manner as the pushing fork 78 in order to push on the end of a rod projecting relative to a spacer grid.

In order to implement the removal device according to the invention, the operator displaces the carriage 22 and the crossed carriage device, so as to place the jaws of the tongs in an open position on either side of the rod or of the piece of pencil 6a to be removed, as may be seen in FIG. 4.

The operator then activates the wheel 29 of the remote control 28 in order to obtain the desired gripping of the tongs on the rod. The tongs are then in their position shown in FIG. 8.

If the spindle of the tongs is mounted on a sliding shaft, such as the shaft 77, which may be displaced by a remote control and a rack and pinion assembly, it is possible to measure, from the control station, the removal force on the rod by a dynamometric device pushing on the flexible element of the ball remote control for displacing the shaft 77 situated at the level of the control station 18. The use of dynamometric springs makes it possible directly to measure the pushing force necessary to displace the pencil or the piece of rod to be removed.

If the removal force does not exceed a predetermined value, the rod or the piece of rod is then completely removed by raising the displacement assembly 24 along the rod 20 by the carriage 22 driven by the winch 23. When the piece of rod has been completely removed, the column 20 is displaced laterally and then the tongs are opened so that the piece of rod 6'a is recovered in the vessel 13.

When the piece of rod to be removed is longer than the gap separating two grids, the rod is first slid on the side where the previous piece of rod has been removed, in order to completely release one of the end parts of the rod from the corresponding grid. The crossed carriage device is then used to pull the rod slightly outwards from the assembly grid and it is then removed by displacing the carriage 22 in the vertical direction. The rod is pulled in an oblique direction relative to its axis of origin, but the flexion angle of this rod is sufficiently small for the flexibility of the sheath to be able to permit removal.

Use may also be made of a device comprising means for support and displacement consisting of two crossed carriage assemblies.

A first crossed carriage assembly is equipped with the removal tool comprising the gripping tongs. The second crossed carriage device is equipped with a tool module comprising cutting tongs which make it possible to cut the sheath of the rod.

The work operation consists, by using the crossed carriage device equipped with the cutting tongs tool module, in cutting the rod at a sufficient height above a grid so that it can be removed at a later stage.

The piece of cut rod is held with the gripping tongs and the piece of rod held by the tongs is cut at a short distance from the second spacer grid.

The piece of rod disposed between the two grids is released from the assembly and deposited in the vessel.

It is thus possible successively to remove various parts of rod between two successive spacer grids.

The mounting of the cutting tongs tool module may be designed so as to come into position vertically above the removal tongs while maneuvering the crossed carriage device, which makes it possible to work on the same piece of rod with the cutting tongs and with the gripping tongs.

As explained hereinabove, if a fuel rod is broken inside a spacer grid, it is necessary to push this piece of rod so that it can be seized by the tongs. This removal operation may be implemented by using a support comprising two crossed carriage devices. One of the crossed carriage devices is equipped with the pushing tool shown in FIG. 10. The second crossed carriage device is equipped with the removal tool comprising the gripping tongs, shown in FIGS. 3, 4 and 5.

The device and the method according to the invention thus make it possible to remove all the peripheral rods of a fuel assembly which have suffered any damage which may lead to a complete breakage. Dismantling of the fuel assemblies is thus avoided, which assemblies may be reused in the core of the reactor. The operating costs of the plant are thus reduced.

The gripping tongs may have a form different from that which has been described, these tongs being activated remotely by a control device other than a ball remote control.

It is also possible to use any form of tongs comprising displacement adjustment means and immobilizing means of any type.

It is also possible to use any related pushing or pulling device in order to remove pieces of rod in any case which may arise.

The invention also applies in the case of all fuel assemblies for light-water reactors consisting of bundles of parallel fuel rods held in a framework.

We claim:

1. Device for removing peripheral fuel rods (6a) of a fuel assembly (1) of a nuclear reactor comprising a framework consisting of a plurality of spacer grids (2) holding the fuel rods (6) in a uniform network in transverse directions and in the axial directions of the fuel rods (6) by gripping means associated with cells of the grids (2) in which the rods (6) are inserted as well as of guide tubes (3) replacing certain rods (6) in the network and of end joining pieces (4, 5) fixed on ends of guide tubes (3), removal being performed remotely and under a certain depth of water in a storage pool for fuel assemblies after removing an end joining piece (4, 5) of the assembly by virtue of the device which comprises a rod (20) on which is mounted a means (22, 24, 25) for support and displacement of a work tool and which is movable in an axial direction of the rod (20) and in two directions perpendicular to this axial direction, wherein the work tool comprises:
    (a) tongs (41) consisting of two arms (43, 44) articulated together about a shaft (35) fixed on the means (25) for support and displacement in a direction parallel to the axis of the rod (20) and comprising end jaws (57, 58) which are capable of gripping a fuel rod (6a) between them;
    (b) means (64, 65) for remotely controlling the tongs (41), comprising an element (65) which is movable in translation and an element (64) for guiding the movable element, (65) each connected to an arm (43, 44) of the tongs (41) in the vicinity of the end of the corresponding arm opposite to the end jaws; and
    (c) at least one video camera (26) carried by the means (22, 24, 25) for support and displacement in order to supply an image of the zone in which the rods (6a) are gripped, removal being performed by displacing the means (22, 24, 25) for support and displacement in the vertical direction after positioning and gripping the jaws (57, 58) of the tongs on a part of the rod (6a).

2. Device according to claim 10, wherein the means for remotely controlling the tongs (41) consist of a ball remote control comprising a sheath (64) fixed on a first arm (43) of the tongs (41) and of a flexible element (65) which is movable inside the sheath (64) fixed at an end thereof on the second arm (44) of the tongs (41).

3. Device according to claim 10, wherein each of the branches (43, 44) of the tongs comprises an oblong aperture (47, 48) and that a guide plate (45), fixed rigidly on the shaft (35) of the tongs (41), comprises a cavity (49) directed along an axis (51) of symmetry of the tongs, a positioning spindle (50) being engaged in two coinciding parts of the apertures (47, 48) of the arms (43, 44) and comprising, at its end, a guide head (50c) engaged in the cavity (49) of the guide plate (45) so as to ensure a perfectly symmetrical displacement relative to the axis (51) of the two arms of the tongs and immobilization of the open and closed positions of these tongs by means of the positioning spindle (50) resting in the coinciding end parts of the oblong apertures (47, 48) of the arms (43, 44).

4. Device according to claim 10, wherein the end jaws (57, 58) of the arms (43, 44) of the tongs (41) comprise ends having a thickness sufficiently small to permit them to engage between two successive peripheral rods on either side of a rod to be removed.

5. Device according to claim 10, wherein the shaft (35) of the tongs is fixed on the means (22, 24, 25) for support and displacement by means of a tool body (32) comprising a slide bush (75) in which is mounted a sliding shaft (77) whose central part forms a rack (77'), the shaft (35) of the gripping tongs (41) being fixed on the sliding shaft (77) with vertical displacement and the rack (77') being driven in a vertical displacement by displacement of a flexible element of a ball remote control (82, 83) connected to the end of a rack (86) driving the displacement of the rack (77') and of the sliding shaft (77) by means of pinions (87, 88, 89).

6. Device according to claim 14, wherein the shaft (77) comprises means for fixing pushing means (78, 80) on a piece of fuel rod located inside a spacer grid.

* * * * *